United States Patent [19]

Iida et al.

[11] Patent Number: 4,488,798
[45] Date of Patent: Dec. 18, 1984

[54] AUTOMATIC FOCUSING DEVICE

[75] Inventors: Takashi Iida, Sakai; Masayuki Ueyama, Toyonaka; Toshihiko Ishimura, Sakai, all of Japan

[73] Assignee: Minolta Camera Kabushiki Kaisha, Osaka, Japan

[21] Appl. No.: 503,564

[22] Filed: Jun. 13, 1983

[30] Foreign Application Priority Data

Jun. 21, 1982 [JP] Japan ................. 57-107340

[51] Int. Cl.³ .............................. G03B 7/08
[52] U.S. Cl. .................................. 354/402
[58] Field of Search ................. 354/402–409

[56] References Cited

U.S. PATENT DOCUMENTS

| | | | |
|---|---|---|---|
| 4,157,217 | 6/1979 | Isono | 354/405 |
| 4,160,904 | 7/1979 | Wilwerding | 354/405 X |
| 4,182,563 | 1/1980 | Biber et al. | 354/401 |
| 4,305,657 | 12/1981 | Masunaga et al. | 354/409 X |
| 4,344,679 | 8/1982 | Yagi et al. | 354/409 |
| 4,423,935 | 1/1984 | Eguchi et al. | 354/402 |

FOREIGN PATENT DOCUMENTS 127524 2/1980 Japan .

*Primary Examiner*—William B. Perkey
*Attorney, Agent, or Firm*—Watson Cole Grindle & Watson

[57] ABSTRACT

Disclosed herein is an automatic focusing device of a camera for use with an exchangeable zoom lens which includes an objective adjustable for both focusing and zooming and a signal generator for generating a focal length signal. The automatic focus control device comprises a focus detector for generating a focus detecting signal $\Delta L$ representing the amount of and the direction of the deviation (defocusing) of an image relative to a predetermined film plane, a motor driven for focus adjustment of the objective, and an operation circuit for determining the amount of and the direction of the driving of the motor in accordance with the focus detection signal and the focal length signal.

7 Claims, 10 Drawing Figures

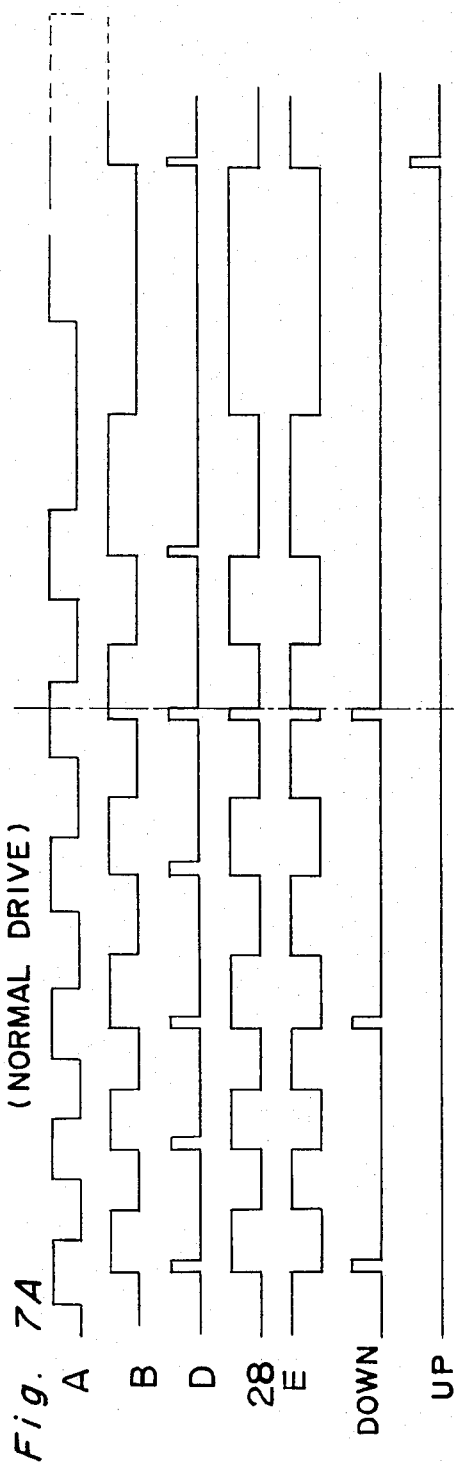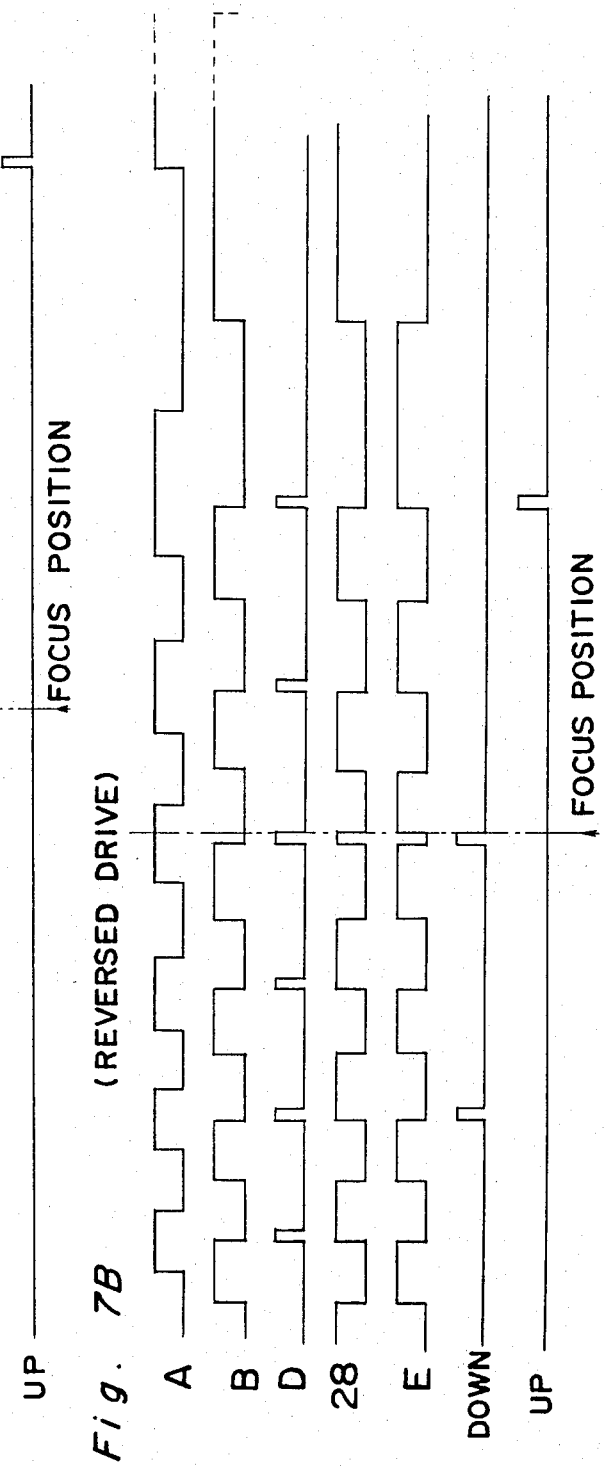

AUTOMATIC FOCUSING DEVICE

FIELD OF THE INVENTION

The present invention relates to an automatic focusing device for use in a camera, and more particularly, to a device for controlling movement of an exchangeable zoom lens of an automatic focusing camera for positioning the zoom lens in a correct in-focus position.

BACKGROUND OF THE INVENTION

In an automatic focusing camera, positioning amount of a lens for focus adjustment is generally calculated on the basis of a defocusing amount, i.e., the amount of deviation of an image-forming focal point relative to a predetermined film plane to control the positioning of the lens by a motor for adjusting the focus.

With respect to a focus lens of which the whole body is positioned for adjusting the focus, in general, there is a relationship between a defocusing amount $\Delta L$ and an amount $\Delta d$ of positioning of the focus lens for adjusting the focus, which is approximately formularized as follows:

$$\Delta d = C \cdot \Delta L$$

wherein C represents a coefficient varying with a focal length of the lens. There has been proposed in the art a device for controlling movement of a focus lens in which the lens is positioned in the amount $\Delta d$ obtained by the aforementioned focus-adjusting equation. For adjusting the focus of a zoom lens on the basis of a value calculated by the aforementioned equation, however, it is necessary to change the coefficient C in proportion to changes in a focal length of a zoom lens since the coefficient C varies with the set focal length.

SUMMARY OF THE INVENTION

In consideration of the aforementioned circumstances, an essential object of the present invention is to provide a device for controlling movement of a zoom lens in an automatic focusing camera in which division is effected on pulses generated by rotation of a motor for positioning the zoom lens in a ratio corresponding to an angle of rotation of a zoom ring thereof and the divided pulses are counted for positioning the zoom lens in a correct in-focus position, thereby automatically determining the aforementioned coefficient C.

According to the present invention, there is provided an automatic focusing device of a camera for use with an exchangeable zoom lens which includes an objective adjustable for both focusing and zooming and a signal means for generating a focal length signal representing the focal length of the objective set by the zooming, which comprises a focus detection means for detecting an image of an object through the objective to generate a focus detection signal $\Delta L$ representing the amount of and the direction of the deviation (defocusing) of the image relative to a predetermined film plane, a motor driven for focus adjustment of the objective, an operation circuit means for determining the amount of and the direction of the driving of the motor in accordance with the focus detection signal from the focus detection means and the focal length signal from the signal means of the exchangeable zoom lens such that correction by the set focal length is made to the focus adjustment of the objective, and a motor driving circuit for driving the motor under the control of the operation circuit means.

BRIEF EXPLANATION OF THE DRAWINGS

FIG. 7, 7A and 7B are time charts for an essential portion of the circuit shown in FIG. 3.

DESCRIPTION OF A PREFERRED EMBODIMENT

Figure 1:
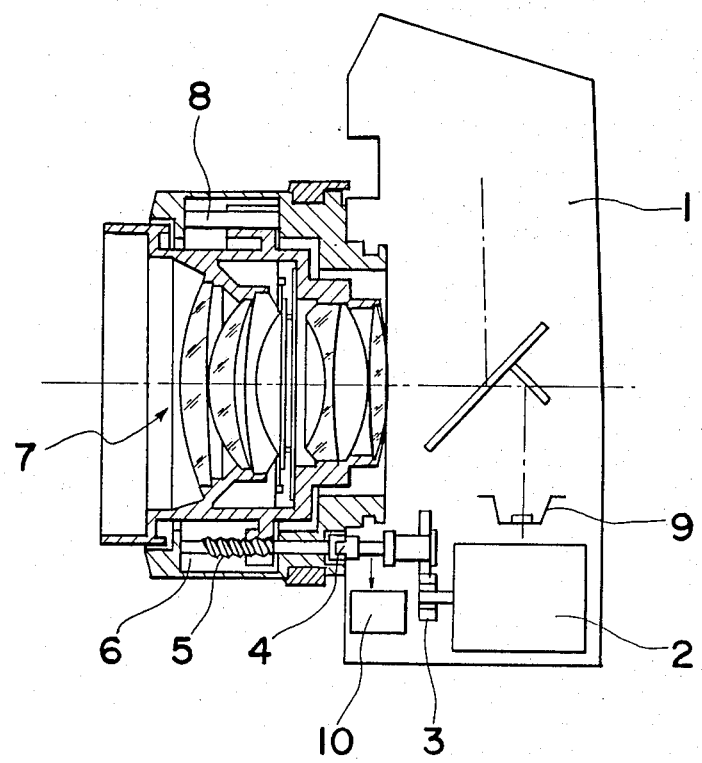
FIG. 1 is a partially fragmented cross sectional view of a photographic camera to which a device according to the present invention is applied.

Referring now to FIG. 1 of the drawings, there is shown an automatic focusing camera to be used in association with a device according to the present invention, which comprises a housing 1, a motor 2 provided in the housing 1 for driving a feed screw 5 connected to a sliding mechanism 3 as well as to a driving transmission means 4, a nut 6 fixed to a zoom lens 7 for engagement with the feed screw 5 and a guide bar 8 for guiding movement of the zoom lens 7 in the lateral direction of FIG. 1 for adjusting the focus. The camera further includes a range finder 9 and a pulse generator 10 for generating pulses in a number corresponding to the amount of movement of the zoom lens 7.

Figure 2:
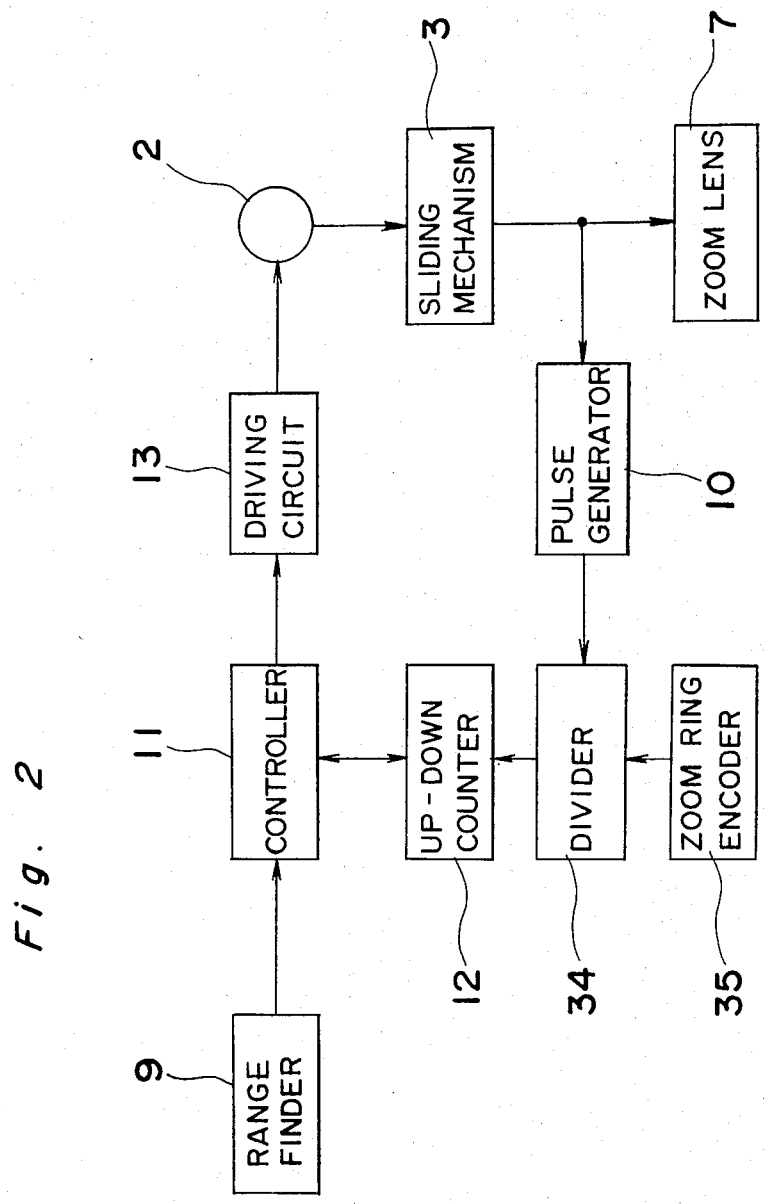
FIG. 2 is a block diagram showing an embodiment of the present invention.

As shown in FIG. 2, a signal representative of a defocusing amount $\Delta L$ and the direction of positioning of the zoom lens 7 is input in a controller 11 which, in turn, calculates a lens positioning amount $\Delta d$ for focusing on the basis of the defocusing amount $\Delta L$, whereby the lens positioning amount $\Delta d$ is converted into a digital data to be routed to an up-down counter 12. The controller 11 further outputs a signal toward a driving circuit 13 for driving the motor 2. The pulse generator 10 generates a pulse per unit distance of movement of the zoom lens 7 which is driven by the motor 2 through the sliding mechanism 3, and the output pulse from the pulse generator 10 is routed to a divider 34. The divider 34 further receives a data output from a zoom ring encoder 35 in correspondence to an angle of rotation of a zoom ring (not shown) of the zoom lens 7, to scale down the pulses generated from the pulse generator 10 in a ratio corresponding to the data from the zoom ring encoder 35.

The data output from the zoom ring encoder 35 corresponds to a focal length of the zoom lens 7 set by an operator while the pulse output from the divider 34 has a periodic cycle corresponding to the set value of the focal length. The pulse output from the divider 34 is input in the up-down counter 12, which decreases the contents of or effects down-counting from a preset value of the aforementioned lens positioning amount $\Delta d$ upon each receipt of one pulse from the divider 34. In this case, the down-counting period corresponds to the set value of the focal length of the zoom lens 7. When the content of the up-down counter 12 reaches zero, i.e., when the zoom lens 7 reaches a correct in-focus position, the controller 11 generates a signal to the driving circuit 13 to stop the motor 2.

Figure 3:
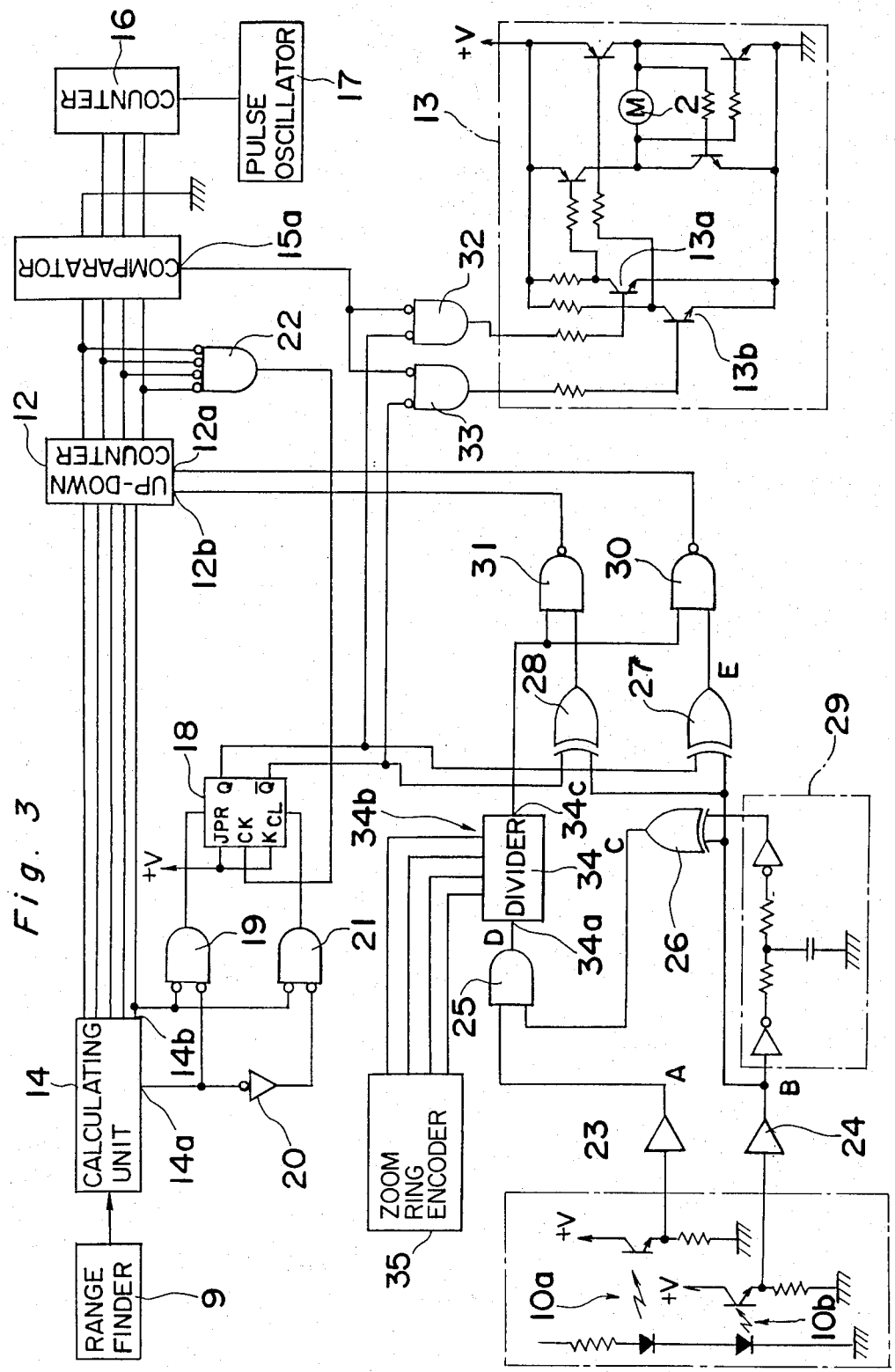
FIG. 3 is a circuit diagram of the embodiment of the present invention.

Attention is now drawn to FIG. 3, in which a circuit for moving the zoom lens 7 is shown in detail.

The controller 11 as shown in FIG. 2 is formed by portions of the circuit of FIG. 3 excluding the range finder 9, the pulse generator 10, the up-down counter 12, the driving circuit 13, the divider 34 and the zoom ring encoder 35. A calculating unit 14 receives the signal representing the defocusing amount ΔL and calculates the lens positioning amount Δd, and, in turn, produces digital data of four bits representing the amount Δd. The output terminals of the calculating unit 14 are connected to preset data terminals of four bits of the up-down counter 12.

Data output terminals of four bits of the up-down counter 12 are connected to first four-bit data input terminals of a comparator 15 while the most significant bit of second four-bit data input terminals of the comparator 15 is grounded and succeeding three bits are connected to data output terminals of three bits of the counter 16. A count input terminal of the counter 16 is connected with an output terminal of a pulse oscillator 17. A circuit thus formed by the comparator 15, the counter 16 and the pulse oscillator 17 controls the driving circuit 13 to intermittently supply power to the motor 2 as the zoom lens 7 approaches the in-focus position by generating a signal to successively shorten the period of the intermittent power supply for decelerating the motor 2.

Figure 4:
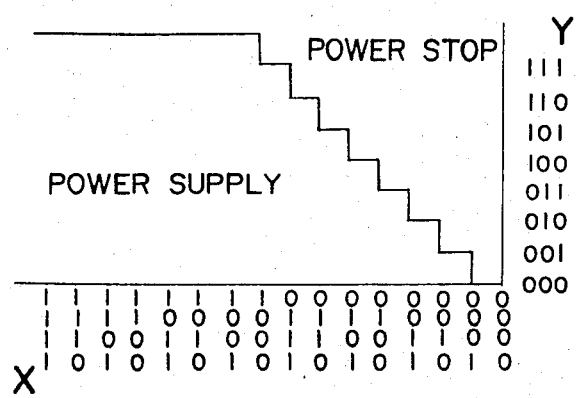
FIG. 4 is a graph showing amount of power supply to a motor varied with changes in an output X of an up-down counter 12 and an output Y of a counter 16.
Figure 5:
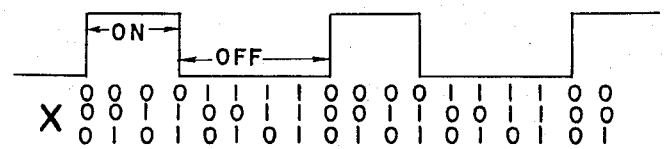
FIG. 5 is a time chart showing the way of power supply to the motor.

The oscillator 17 generates pulses respectively having a predetermined frequency, which are counted by the counter 16. Since the counter 16 is a three-bit counter, it repeatedly counts "000" to "111" as shown by the ordinate Y in FIG. 4. The comparator 15 compares the value counted by the up-down counter 12 and the value counted by the counter 16 for making its terminal 15a at "0" during a period when the value counted by the up-down counter 12 is larger than that of the counter 16. On the other hand, the value of the up-down counter 12 is reduced as the zoom lens 7 approaches the correct in-focus position as shown by the abscissa X in FIG. 4, whereas the terminal 15a of the comparator 15 remains at "0" for continuously driving the motor 2 when the zoom lens 7 is remote from the in-focus position and the most significant bit of the up-down counter 12 is at "1". As the zoom lens 7 approaches the in-focus position, the count value of the up-down counter 12 becomes smaller than a periodic count value of the counter 16, during when the terminal 15a of the comparator 15 is inverted to "1". Since the count value of the counter 16 varies in a predetermined period with successive reduction of the output data of the up-down counter 12, the count value of the up-down counter 12 intermittently exceeds that of the counter 16 with a successively shortened period. Thus, the terminal 15a of the comparator 15 intermittently becomes "0" with a successively shortened period while the motor 2 is intermittenly supplied with power also with a successively shortened period as shown in FIG. 5, so that the amount of power supply to the motor 2 is gradually reduced to decelerate the motor 2.

A J-K flip-flop 18 receives pulses appearing at a terminal 14b of the calculating unit 14 on a preset terminal PR through an AND circuit 19 when a terminal 14a is at "0". The terminal 14a generates a signal representative of the direction of movement of the zoom lens 7.

When the terminal 14a generates a signal of "1", this signal is inverted and fed to an AND circuit 21. Under this condition, the J-K flip-flop 18 receives pulses appearing at the terminal 14b on a clear terminal CL through the AND circuit 19. Initial setting of the flip-flop 18 is effected in compliance with the direction of movement of the zoom lens by the inputs applied to the preset terminal PR and the clear terminal CL such that the Q output terminal of the flip-flop 18 becomes "1" when a pulse is input in the preset terminal PR while the Q̄ output terminal becomes "1" when a pulse is input in the clear terminal CL. A clock input terminal CK of the flip-flop 18 is connected with an output terminal of an AND circuit 22, four-bit inverting input terminals of which are connected respectively with the four-bit data output terminals of the up-down counter 12. Therefore, when the up-down counter 12 counts zero, levels of the Q and Q̄ output terminals of the flip-flop 18 are inverted by the pulse applied to the clock input terminal CK.

Output terminals of a pair of photo couplers 10a and 10b forming the pulse generator 10 are respectively connected to input terminals of waveform shaping circuits 23 and 24, while an output terminal of the waveform shaping circuit 23 is connected to a first input terminal of an AND circuit 25 and an output terminal of the waveform shaping circuit 24 is connected to first input terminals of exclusive OR circuits 26, 27 and 28 respectively. The output terminal of the waveform shaping circuit 24 is further connected through a delay circuit 29 to a second input terminal of the exclusive OR circuit 26, the output terminal of which is connected to a second input terminal of the AND circuit 25. Further, the Q output terminal of the J-K flip-flop 18 is connected to a second input terminal of the exclusive OR circuit 27 while its Q̄ output terminal is connected to a second input terminal of the exclusive OR circuit 28. Output terminals of the exclusive OR circuits 27 and 28 are connected to first input terminals of NAND circuits 30 and 31, respectively. The output terminal of the AND circuit 25 is connected to a pulse input terminal 34a of the divider 34, a data input terminal 34b of which is connected with a data input terminal of the zoom ring encoder 35 and a pulse generating terminal 34c is connected with second input terminals of the NAND circuits 30 and 31, respectively. An output terminal of the NAND circuit 30 is connected to an up-input terminal 12a for increasing the contents of the up-down counter 12 while an output terminal of the NAND circuit 31 is connected to a down-input terminal 12b for increasing the contents of the up-down counter 12.

Figure 6:
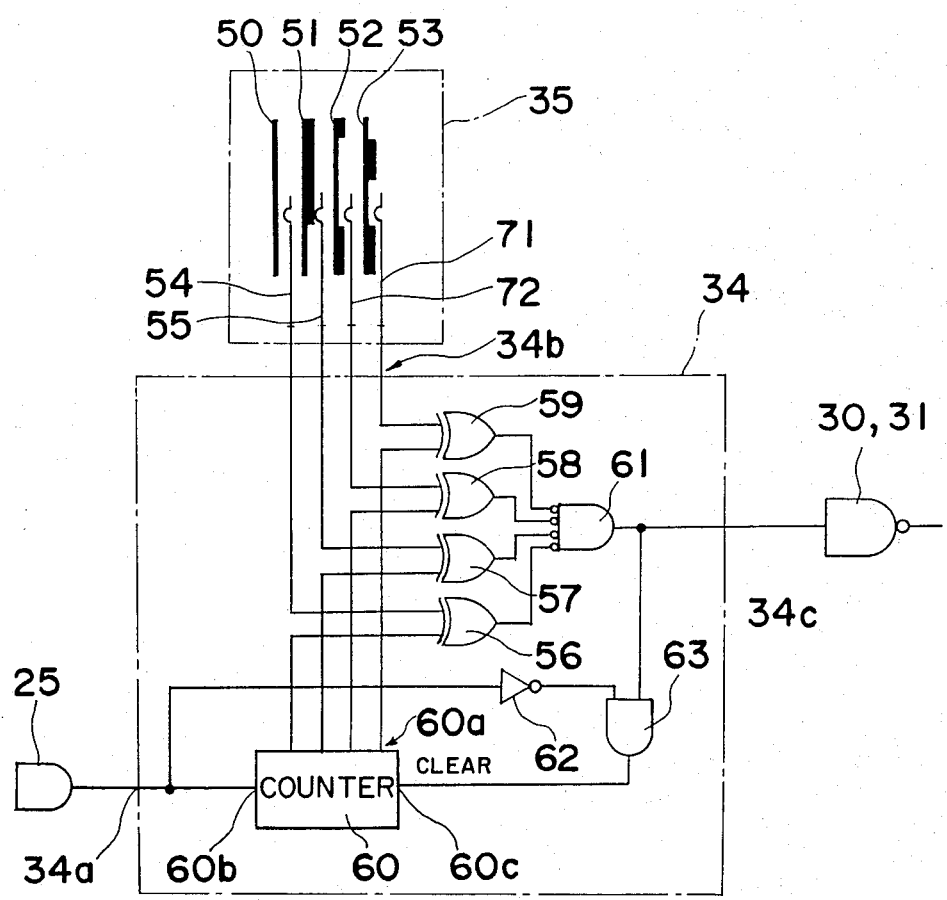
FIG. 6 is a circuit diagram showing arrangement of a divider 34 and a zoom ring encoder 35 shown in FIG. 3.

As shown in FIG. 6 in detail, the divider 34 and the zoom ring encoder 35 are arranged in such a manner that contact members 54, 55, 71 and 72 respectively being slidably in contact with four coder plates 50 through 53 are connected to the four-bit data input terminals 34b of the divider 34. Through one of the data input terminals 34b, the contact member 54 of the zoom ring encoder 35 is connected to a first input terminal of an exclusive OR circuit 56 of the divider 34 while the contact members 55, 71 and 72 are connected to first input terminals of exclusive OR circuits 57, 58 and 59, respectively. Second input terminals of the exclusive OR circuits 56 through 59 are respectively connected with four-bit data output terminals 60a of a counter 60 while output terminals of the exclusive OR circuits 56 through 59 are respectively connected to four input terminals of an AND circuit 61. Output terminals of the AND circuit 61 are respectively connected with second input terminals of NAND circuits 30 and 31 as shown in FIG. 3. The output terminal of the AND circuit 25 in FIG. 3 is connected through a terminal 34a to a count input terminal 60b of a counter 60 as well as to an input terminal of an inverter circuit 62. Further, output terminals of the inverter circuit 62 and the AND circuit 61 are respectively connected to first and second input terminals of an AND circuit 63, an output terminal of which is connected to a clear terminal 60c of the counter 60.

Figure 7:
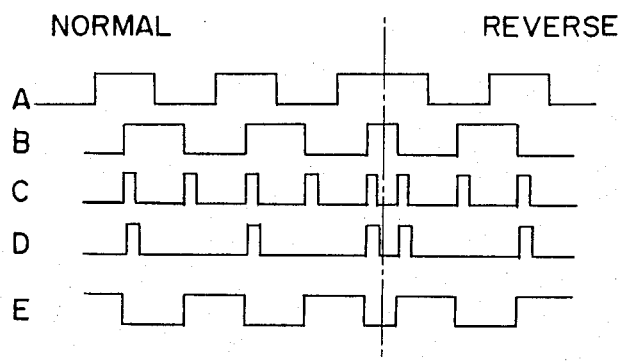

Attention is now drawn to FIG. 7, which shows a time chart illustrative of operation of the aforementioned circuit. With respect to the waveform shaping circuits 23 and 24 for shaping the waveforms of the outputs of two photo couplers 10a and 10b of the pulse generator 10, the phases of the outputs thereof deviate by 90° from each other, with the phase difference being inverted upon inversion of the direction of lens movement, as shown at A and B in FIG. 7. The exclusive OR circuit 26 outputs a pulse having a pulse width equivalent to a period during when the state (1 or 0) of output of the waveform shaping circuit 24 is reversed from that of an output signal of the delay circuit 29 which is delayed by the delay of the delay circuit 29 as shown at C in FIG. 7. That pulse is synchronized with the positive edge and the negative edge of the output of the waveform shaping circuit.

The output of the AND circuit 25 becomes "1" only when the outputs from the waveform shaping circuit 23 and the exclusive OR circuit 26 are both at "1", and the AND circuit 25 generates a pulse only when the output of the waveform shaping circuit 24 rises in case the zoom lens 7 is moved in a normal direction extending from the camera housing while generating a pulse only when the output of the waveform shaping circuit 24 falls in case the zoom lens 7 is moved in a reversed direction approaching the camera housing, as shown at D in FIG. 7.

Figure 8:
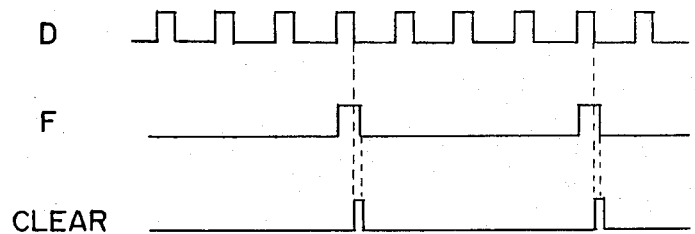
FIG. 8 is a time chart showing an essential portion of the circuit shown in FIG. 6.

The pulses from the AND circuit 25 input in the divider 34 through the terminal 34a are taken through the count terminal 60b in the counter 60, which in turn counts those pulses. When the count value at the counter 60 coincides with the output from the zoom ring encoder 35 with coincidence of the respective two inputs of the exclusive OR circuits 56 through 59, the output terminals of the exclusive OR circuits 56 through 59 become "0" respectively while the output terminal of the AND circuit 61 is inverted to "1". Upon such inversion to "1" of the output of the AND circuit 61, the counter 60 is cleared off to count "0" which is not coincident with the output from the zoom ring encoder 35, whereby the output of the AND circuit 61 is inverted to "0". That is, the divider 34 generates a pulse at the output terminal 34c upon each coincidence of the count value of the pulse input from the AND circuit 25 with the output from the zoom ring encoder 35 while dividing the input pulse in compliance with the data of the zoom ring encoder 35 to output the same. When, for example, the zoom ring encoder 35 is set at "0100", the divider 34 generates a pulse F upon each receipt of four pulses D from the AND circuit 25 as shown in FIG. 8. Upon rise of the pulse F, the counter 60 is cleared off, thereby making the pulse F decay.

The exclusive OR circuit 27 inverts the output of the waveform shaping circuit 24 to generate the same when the Q output terminal of the flip-flop 18 is at "1" while generating the output from the waveform shaping circuit 24 in a non-inverted manner when the Q output terminal of the flip-flop 18 is at "0" as shown at E in FIG. 7. In turn, the exclusive OR circuit 28 inverts the output of the waveform shaping circuit 24 when the $\bar{Q}$ output terminal of the flip-flop 18 is at "1" while generating the output of the waveform shaping circuit 24 in a non-inverted manner when the $\bar{Q}$ output terminal of the flip-flop 18 is at "0". By this circuit arrangement, the Q output terminal and the $\bar{Q}$ output terminal of the flip-flop 18 are always in reverse with each other and when one of the exclusive OR circuits 27 and 28 generates an output of the same logic state as that of the waveform shaping circuit 24, the other generates that inverted from said output of the waveform shaping circuit 24. When, for example, the Q output terminal of the flip-flop 18 is at "1", the exclusive OR circuit 27 generates an output inverted from that of the waveform shaping circuit 24 while the exclusive OR circuit 28 generates an output identical in logic state to that of the waveform shaping circuit 24.

The NAND circuit 30 generates pulses which become "0" when the output terminal of the exclusive OR circuit 27 and the output terminal 34c of the divider 34 are both at "1" with its output otherwise remaining at "1". In turn, the NAND circuit 31 generates pulses which become "0" when the output terminal of the exclusive OR circuit 28 and the output terminal 34c of the divider 34 are both at "1", with its output otherwise remaining at "1". That is, assuming that, for example, the $\bar{Q}$ output terminal of the flip-flop 18 is at "0" when the zoom lens 7 moves in the normal direction, the exclusive OR circuit 28 generates the output of the waveform shaping circuit 24 in a non-inverted manner while the NAND circuit 31 generates at its output terminal a pulse which becomes "0" upon positive going of the output of the waveform shaping circuit 24. That pulse is input in the down-input terminal of the up-down counter 12. At this time the output of the NAND circuit 30 remains at "1", the signal of which is input in the up-input terminal of the up-down counter 12. On the other hand, when, for example, the Q output terminal of the flip-flop 18 is at "0" in lens movement in a direction reversed to that of rotation of the motor 2, i.e., in case the zoom lens 7 goes beyond the correct in-focus position, the exclusive OR circuit 27 generates the output of the waveform shaping circuit 24 in a non-inverted manner while the NAND circuit 30 outputs a pulse which becomes "0" upon negative going of the output of the waveform shaping circuit 24, that pulse being input in the up-input terminal of the up-down counter 12. At this time the output of the NAND circuit 31 remains at "1", the signal of which is input in the down-input terminal of the up-down counter 12. While the zoom lens 7 is not beyond the in-focus position in movement toward the same in the reversed direction, the up-down counter 12 still effects down-counting since the divider 34 outputs pulses during generation, from the exclusive OR circuit 28, of a signal inverted from the output of the waveform shaping circuit 24. When the zoom lens 7 goes beyond the in-focus position, the exclusive OR circuit 27 generates a signal inverted from the output of the waveform shaping circuit 24, whereby the updown counter effects up-counting. In other words, the counting operation at the up-down counter 12 is switched from up-counting to down-counting or from down-counting to up-counting dependent upon condition of either of the flip-flop 18 and the direction of the zoom lens movement, i.e., depending on which is in process between the A phase and the B phase. That is, the up-down counter 12 effects down-counting when the zoom lens 7 is moved in the normal direction and the Q output terminal of the flip-flop 18 remains at "1" until the zoom lens 7 reaches the in-focus position, while effecting up-counting when the zoom lens 7 goes beyond the in-focus position and that Q output terminal becomes "0". On the other hand, when the zoom lens 7 is moved in the reversed direction and the Q output terminal of the flip-flop 18 remains at "0" until the zoom lens 7 reaches the in-focus position, the up-down counter 12 effects down-counting while effecting up-counting when the zoom lens 7 goes beyond the in-focus position and said Q output terminal becomes "1".

The Q output terminal of the flip-flop 18 is connected to a first input terminal of an inverted input AND circuit 32 while the $\overline{Q}$ output terminal thereof is connected to a first input terminal of an inverted input AND circuit 33. Second input terminals of the AND circuits 32 and 33 are respectively connected with the terminal 15a of the comparator 15 which generates a signal "0" if the count data in the counter 16 is smaller than that in the up-down counter 12. The output terminal of the AND circuit 32 is connected to the base of a transistor 13a for supplying power to the motor 2 of the driving circuit 13 for reversedly rotating the same while an output terminal of the AND circuit 32 is connected to the base of a transistor 13b for supplying the motor 2 with power for normally rotating the same. The AND circuits 32 and 33 function to switch the direction of power supply to the motor 2 depending on the condition of the flip-flop 18 in such a manner that when the terminal 15a of the comparator 15 is at "0", the AND circuit 32 or 33, that connected with either the Q output terminal or the $\overline{Q}$ output terminal of the flip-flop 18 which is at "0", becomes "1" for supplying the transistor 13b or 13a with power for normally or reversely rotating the motor 2. When, for example, the terminal 15a of the comparator 15 is at "0" while the Q output terminal of the flip-flop 18 is at "1", the output of the AND circuit 33 becomes "1" to supply power to the transistor 13b for normally rotating the motor 2.

Operation of the aforementioned circuit is hereinafter described in detail.

A defocusing amount ΔL generated from the range finder 9 is input in the calculating unit 14, which calculates a lens positioning amount Δd for adjusting the focus, and a digital data representing the lens positioning amount Δd is input in the up-down counter 12. Further, the calculating unit 14 generates a signal representing the direction for extending the zoom lens 7 with respect to its location for adjusting the focus so that the Q output terminal of the flip-flop 18 is inverted to "1" when the zoom lens 7 is located in a position reaching the in-focus position by extension in the normal direction while the $\overline{Q}$ output terminal of the flip-flop 18 is inverted to "1" when the zoom lens 7 is located in a position reaching the in-focus position by movement in the reversed direction. Then the transistor 13a or 13b of the driving circuit 13 is supplied with power by either the Q output terminal or the $\overline{Q}$ output terminal of the flip-flop 18 so that the motor 2 is driven to be normally or reversedly rotated in a predetermined direction.

When the motor 2 is driven to position the zoom lens 7, the photo couplers 10a and 10b of the pulse generator 10 generate pulses which are out of phase by 90° from each other so that, through the aforementioned operation in compliance with the Q output terminal or the $\overline{Q}$ output terminal of the flip-flop 18, depending on the location of the zoom lens 7, a pulse having a period corresponding to a set focal length of the zoom lens 7 is generated either from the NAND circuit 30 or 31 to be input in the up-count terminal 12a or the down-count terminal 12b of the up-down counter 12.

The up-down counter 12 effects down-counting from the lens positioning amount Δd input from the calculating unit 14 upon each receipt of a pulse at the down-count terminal 12b, to decelerate the motor 2 by effecting intermittent power supply to the motor 2 with a successively shortened period in the aforementioned manner when the zoom lens 7 approaches the in-focus position to give rise to a period during when the count in the up-down counter 12 becomes smaller than that in the counter 16. When the zoom lens 7 reaches the in-focus position, the output of the up-down counter 12 becomes "0" while the output terminal of the AND circuit 22 becomes "1", whereby the clock input terminal of the flip-flop 18 rises to "1" with inversion of the Q and $\overline{Q}$ output terminals thereof. Since, by inertia, movement of the zoom lens 7 is stopped in a position beyond the in-focus position, the inversion of the flip-flop 18 causes the pulse generator 10 to generate pulses of a number corresponding to an overextension amount of the zoom lens 7, which are input through the NAND circuit 30 in the up-count terminal of the up-down counter 12 which, in turn, counts a value corresponding to the overextension amount. Upon such inversion of the flip-flop 18, the motor 2 is driven to be reversedly rotated to move the zoom lens 7 in the reversed direction. Also in this case, the motor 2 is decelerated by intermittent power supply with a succeedingly shortened period as the zoom lens 7 approaches the in-focus position. The zoom lens 7 is brought into a focal range by repeating of the aforementioned operation and is stopped to complete the focus adjustment.

What is claimed is:

1. An automatic focusing device of a camera for use with an exchangeable zoom lens which includes an objective adjustable for both focusing and zooming and a signal means for generating a focal length signal representing the focal length of said objective set by the zooming, said automatic focus control device comprising:
   (a) a focus detection means for detecting an image of an object through said objective to generate a focus detection signal ΔL representing the amount of and the direction of the defocusing of said image relative to a predetermined film plane;
   (b) a motor driven for focus adjustment of said objective;
   (c) an operation circuit means for determining the amount of and the direction of the driving of said motor in accordance with said focus detection signal from said focus detection means and said focal length signal from said signal means of said exchangeable zoom lens such that correction by the set focal length is made to the focus adjustment of said objective; and
   (d) a motor driving circuit for driving said motor under the control of said operation circuit means.

2. The automatic focusing device as defined in claim 1, wherein said operation circuit means includes:
   a translating means for translating said focus detection signal into a corresponding motor driving amount signal representing the amount of the driving of said motor required for the focus adjustment of said objective;

a means for generating an actual focus adjustment signal representing the amount of the focus adjustment having been actually carried out;

a correction means for correcting said actual focus adjustment signal by said focal length signal; and a means for comparing said motor driving amount signal with said corrected actual focus adjustment signal to generate a stop signal for causing said motor driving circuit to interrupt power supply to said motor when said former signal coincides with said latter signal.

3. The automatic focusing device as defined in claim 2, wherein said comparing means includes:

a presettable means preset by said motor driving amount signal and changing its output in accordance with said corrected actual focus adjustment signal;

a reference signal generator for generating a reference signal; and a comparator for comparing said output of said presettable means with said reference signal to generate said stop signal when said output of said presettable means represents a given relationship with respect to said reference signal.

4. The automatic focusing device as defined in claim 3, wherein:

said actual focus adjustment signal generating means includes a pulse generator for generating a train of pulses, the number of which corresponds to the amount of the focus adjustment having been actually carried out;

said correction means includes a frequency divider for frequency-dividing said train of pulses;

said presettable means includes a preset up-down counter preset by said motor drive amount signal to change its output digital signal upon each receipt of said frequency divided pulses;

said reference signal generator includes a means for generating periodically varying digital output; and said comparator is a digital comparator for comparing said digital output of said digital preset counter with said periodically varying digital output to generate said stop signal when the former output becomes smaller than the latter output.

5. The automatic focusing device as defined in claim 4, wherein said operation circuit means further includes a bistable circuit means set to either one of two stable conditions in accordance with the direction of the deviation of said image relative to said film plane represented by said focus detection signal, said preset up-down counter up-counting and down-counting in accordance with the set condition of said bistable circuit means.

6. The automatic focusing device as defined in claim 5, further comprising a means for instructing the power supplying direction to said motor driving circuit in accordance with the set condition of said bistable circuit means.

7. The automatic focusing device as defined in claim 5, further comprising a means for resetting said bistable circuit means when digital output of said preset up-down counter becomes to represent zero.

* * * * *